United States Patent [19]

Milano, Jr.

[11] Patent Number: 4,471,896

[45] Date of Patent: Sep. 18, 1984

[54] SHEET-FEED TRACTOR WITH RESILIENT SPRING CLAMPING SUBASSEMBLY

[75] Inventor: Arthur J. J. Milano, Jr., Burlington, Conn.

[73] Assignee: Data Motion, Incorporated, Torrington, Conn.

[21] Appl. No.: 543,490

[22] Filed: Oct. 19, 1983

[51] Int. Cl.³ .................................................. G03B 1/30

[52] U.S. Cl. .................................... 226/74; 400/616.1

[58] Field of Search .................... 226/74, 75, 170, 171; 400/616.1, 616.2; 403/289, 290, DIG. 9

[56] References Cited

U.S. PATENT DOCUMENTS

| | | | |
|---|---|---|---|
| 3,565,470 | 2/1971 | Nichol et al. | 403/290 |
| 3,693,856 | 9/1972 | Funk | 226/74 |
| 3,930,601 | 1/1976 | Masuda | 226/74 |
| 3,941,288 | 3/1976 | Wanat | 226/74 |
| 4,129,239 | 12/1978 | Hubbard | 226/75 |
| 4,130,230 | 12/1978 | Seitz | 226/74 |
| 4,159,794 | 7/1979 | Seitz | 226/75 |
| 4,194,660 | 3/1980 | Seitz | 226/74 |
| 4,199,091 | 4/1980 | Hubbard | 226/74 |
| 4,214,691 | 7/1980 | Van Namen | 226/74 |
| 4,315,585 | 2/1982 | Seitz | 226/74 |
| 4,344,715 | 8/1982 | Van Horne et al. | 400/616.1 |
| 4,389,007 | 6/1983 | Seitz | 226/74 |

*Primary Examiner*—Leonard D. Christian

[57] ABSTRACT

A tractor for a web feeding assembly having spaced support and drive shafts has a chassis providing a pair of apertures extending therethrough and a belt extending thereabout. A drive pulley mounted in one of the chassis apertures is engaged with the driven surface of the belt and has an aperture therethrough receiving the drive shaft. A convexly arcuate belt support surface cooperates with the drive pulley to define the web drive path for the belt therebetween. A resilient spring clamp is mounted adjacent the other aperture in the chassis and releasably clamps the tractor on the support shaft. The mounting desirably permits the clamp to rotate about the axis of the aperture receiving the support shaft.

16 Claims, 7 Drawing Figures

SHEET-FEED TRACTOR WITH RESILIENT SPRING CLAMPING SUBASSEMBLY

BACKGROUND OF THE INVENTION

The present invention relates to drive tractors which are widely used in printers and other devices for handling webs such as continuous perforated paper, individual sheet paper, tape and the like, fabricated of paper, foil, laminates and other sheet-like material, all collectively referred to hereinafter as "web material".

Generally such devices employ a belt which will engage the web material either by pins or projections on the upper surface or by friction or "clamping" of the web material between the upper surface of the belt and a cover or guide thereabove. Such devices are in widespread use for the applications indicated above and are particularly burgeoning in usage for paper handling in printers for computers and word processing apparatus and in duplicating apparatus.

In Seitz U.S. Pat. No. 4,130,230 granted Dec. 19, 1978; U.S. Pat. No.4,159,794 granted July 3, 1979; U.S. Pat. No. 4,194,660 granted Mar. 25, 1980; and U.S. Pat. No. 4,315,585 granted Feb. 16, 1982, there are illustrated and described tractors of this type employing a one-piece integrally molded continuous synthetic resin belt travelling in a continuous path about a drive sprocket or pulley with which it is drivingly engaged and a cooperating arcuate surface, which is generally a second pulley or sprocket which idles. The described and illustrated tractors are mounted on a pair of spaced parallel extending shafts for use in a web feeder of a printer or like apparatus. The drive shaft is usually of rectangular cross-section and the support shaft of circular cross-section. The drive shaft is inserted in a rectangular recess within the drive sprocket or pulley to operatively engage the pulley and therefore drive the belt.

In Seitz U.S. Pat. Nos. 4,130,230, 4,159,794 and 4,194,660, the tractors are releasably clamped to the support shaft by means of a butterfly type clamping mechanism employing a locking tab to deflect a portion of the support aperture into engagement with the support shaft. Further, rigid clamping of the tractor body on the support shaft may create torque on the drive shaft during rotation thereof by the printer if there is significant error in the center-to-center spacing of the shafts. Such torque may bind the drive shaft and adversely affect the movement of the web of material.

In Seitz U.S. Pat. No. 4,315,585, the clamping mechanism for the tractor on the support shaft is provided on a journal block to permit substantial relative movement between the drive shaft and support shaft in an effort to accomodate variations in center-to-center spacing as the drive shaft is rotatably driven. However, these "accomodated" variations in the center-to-center spacing between the drive and support shafts can adversely affect the accuracy of the web driving function of the tractor. Moreover, the cam lock of the Seitz patent effects some change in the effective center of the aperture through the tractor which can compound the problem of center-to-center spacing accuracy, particularly if compensating relative movement is not provided.

It is an object of the present invention to provide a novel tractor for feeding web material which provides a simple and highly effective clamping mechanism which maintains it common center despite variations in size of the shaft received therein.

It is also an object to provide such a drive tractor which minimizes variations between the center-to-center spacing of the drive and support shafts while tolerating variation in support shaft diameter.

It is also an object to provide such a tractor wherein the novel clamp mechanism may be fabricated readily and assembled to the tractor chassis.

Another object is to provide such a tractor wherein the clamping mechanism does not impose torque on the drive shaft and is readily engaged and disengaged.

It is a further object to provide a drive tractor which may be fabricated readily and relatively economically and which will enjoy a long life in operation.

SUMMARY OF THE INVENTION

It has now been found that the foregoing and related objects may be readily attained in a drive tractor which includes a chassis having a pair of spaced transversely extending apertures therein with at least one aperture being adjacent an end thereof. Extending about the chassis is a flexible endless belt which defines a closed path of travel thereabout. The belt has an outer driving surface to engage the web material and an inner driven surface which is engaged with a drive pulley rotatably mounted in the chassis aperture adjacent the end thereof. The drive pulley has an aperture therethrough for receiving a drive shaft to effect its rotation and thereby that of the belt. Adjacent the end of the chassis spaced from the drive pulley is a convexly arcuate belt support means, and the belt extends about the support means and pulley in a web drive path therebetween. A cover is pivotally mounted on the chassis overlying the belt path and a spring clamp subassembly releasably retains the tractor on a support shaft.

Generally, the resilient spring clamp subassembly will comprise a spring clamp and means rotatably mounting the spring clamp to the chassis. The spring clamp includes a barrel portion having a plurality of extending slots therein and a pair of laterally extending tab portions adjacent the plurality of slots allowing manual biasing of the spring clamp enlarging a support shaft passage therein for release of reception of the support shaft. The spring clamp being rotatably mounted in the chassis by a cylindrical support sleeve having an enlarged collar portion extending outwardly therefrom engaging a mating recess in the chassis for retaining the spring clamp subassembly in a support shaft aperture in the chassis. The resilient spring clamp and mounting means therefor are formed as a unitary integrally molded unit or structure. The mounting means includes a spacer portion which spaces the spring clamp and cylindrical support sleeve from one another by a distance substantially equal to the width of the spacer.

In its preferred form, the spring clamp has a barrel portion which comprises a wall portion of substantially uniform thickness, resilient hinge portions adjacent either side of the uniform wall portion and an arcuate wall portion extending from each of the resilient hinge portions and increasing in thickness from an end adjacent the resilient hinge portions to the other end thereof.

DETAILED DESCRIPTION OF THE ILLUSTRATED EMBODIMENT

Figure 1:
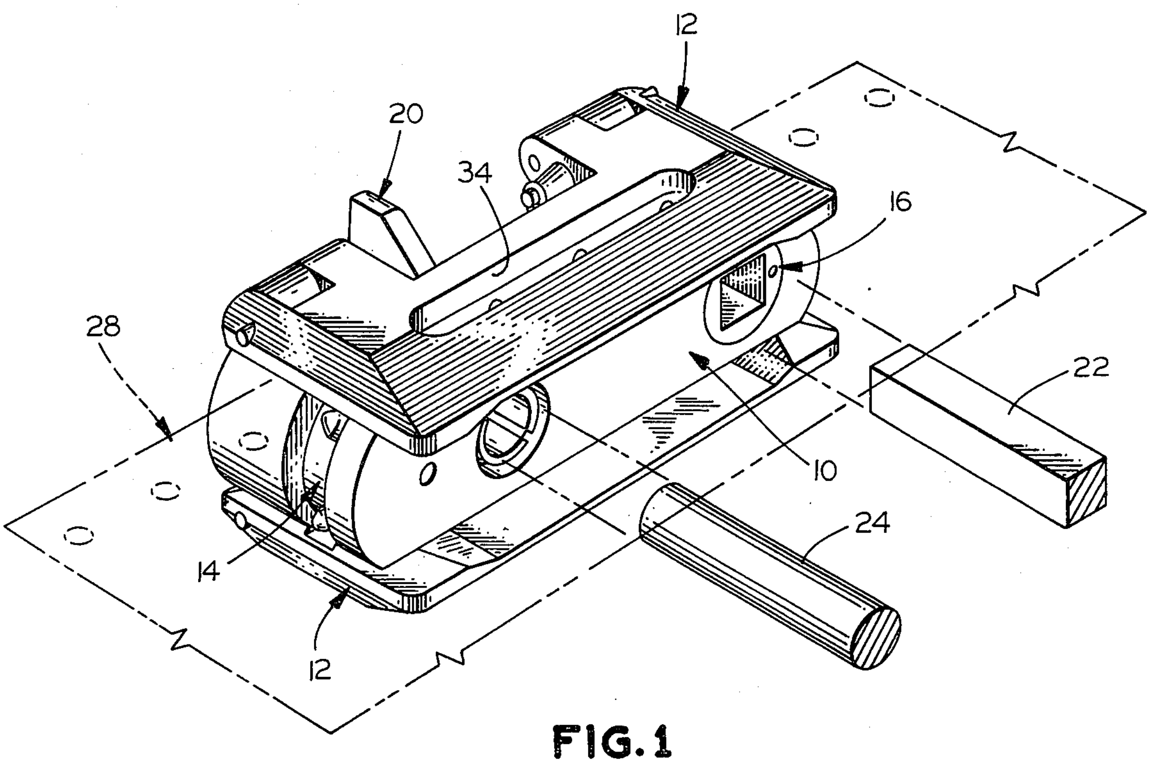
FIG. 1 is a perspective view of a tractor embodying the present invention, also showing the drive and support shafts fragmentarily illustrated in solid line, in spaced relationship to the chassis apertures in which they are received and the paper web fragmentarily shown in phantom line.
Figure 2:
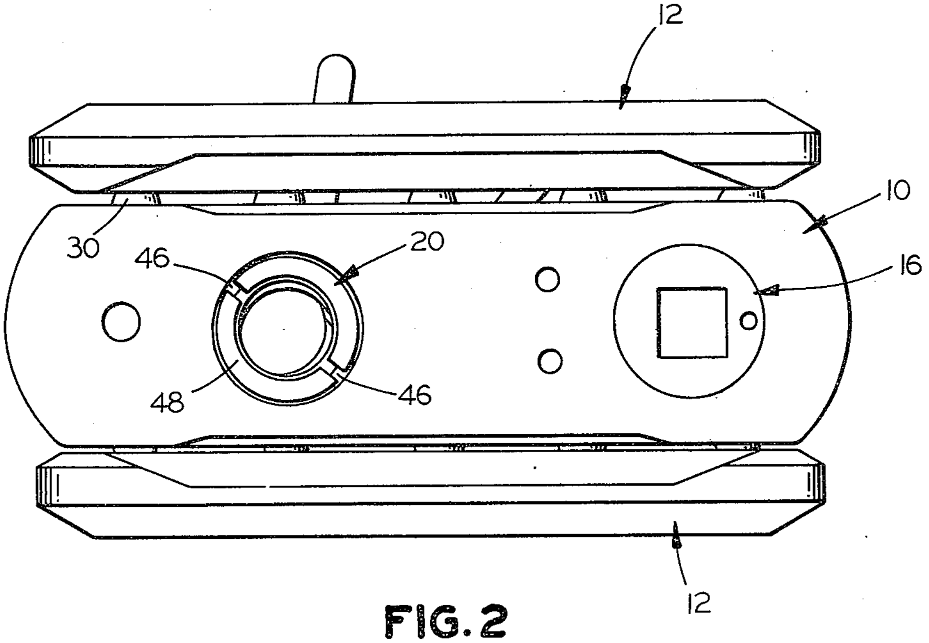
FIG. 2 is a side elevational view of the side of the tractor seen in FIG. 1 drawn to an enlarged scale.

Turning first to FIGS. 1 and 2 of the drawings, therein illustrated a tractor embodying the present invention and comprised of a chassis generally designated by the numeral 10, a pair of covers each generally designated by the numeral 12, a drive belt generally designated by the numeral 14, a drive pulley or sprocket generally designated by the numeral 16, an arcuate or convexly curved guide surface generally designated by the numeral 18 (FIG. 3), and a spring clamp subassembly generally designated by the numeral 20.

Also shown in FIG. 1 are fragmentary portions of the drive shaft 22 of rectangular cross section and the support shaft 24 of circular cross section upon which a pair of the tractors are mounted (only one shown). The tractors are axially movable on the shafts 22 and 24 to adjust the spacing of the tractors for use with webs of material having different widths. A web of perforated paper generally designated by the numeral 28 is shown disposed between the upper cover 12 and belt 14 to be driven along a path defined by the upper surface of the belt 14 when the drive shaft 22 is rotated by the printer or other powered device (not shown) as is conventional.

Figure 3:
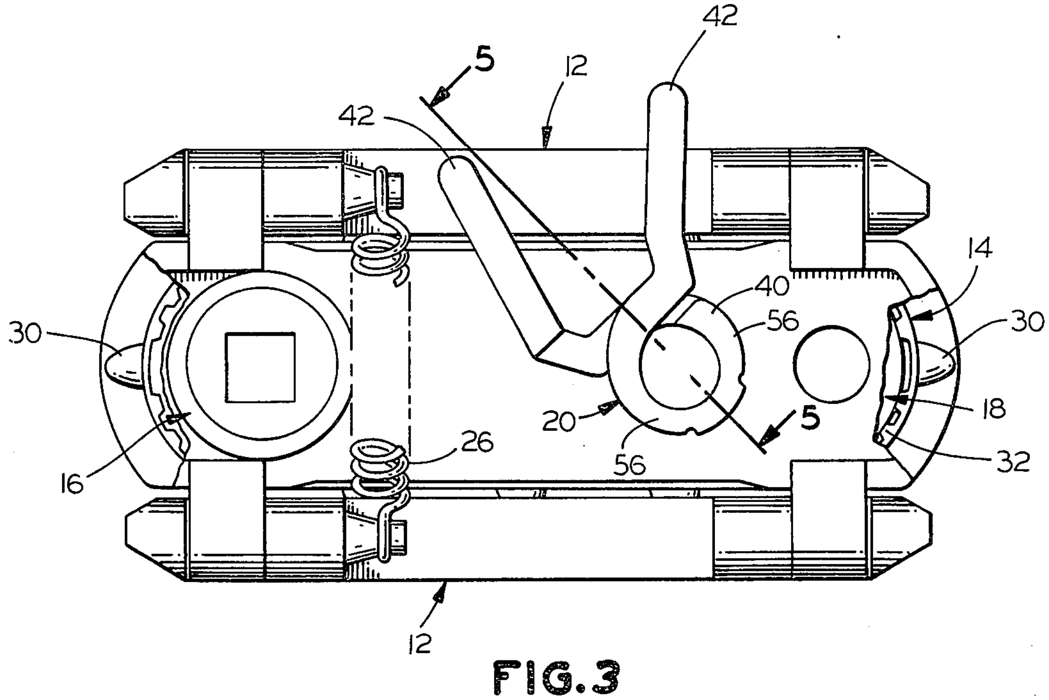
FIG. 3 is an elevational view of the opposite side thereof with portions of the chassis broken away for clarity of illustration.

The endless belt 14 is a one-piece continuous belt integrally molded from synthetic resin and extending about drive sprocket 16 and the arcuate guide surface 18. Thus, the belt 14 follows an endless closed path around the chassis 10 of the tractor as it is driven by the drive sprocket 16. Belt 14 has plurality of projections or pins 30 equally spaced along the outer drive surface thereof for engaging the perforations in the web material 28 to be driven thereby. As depicted in FIG. 3, the inner driven surface of the belt 14 has a plurality of tooth elements 32 formed thereon which engage the teeth of the drive sprocket 16 to allow the belt 14 to be driven thereby. The tooth elements 32 slide on arcuate surface 18 of the tractor chassis 10 as the belt 14 moves in its path thereabout.

This type of one-piece molded belt 14 has a natural resiliency or memory resulting from its being molded as a circle which produces an inherent tendency to arch outwardly from chassis 10 as the belt 14 traverses its path between drive sprocket 16 and arcuate surface 18. As a result of this tendency, web material 28 will be positively engaged by belt projections 30 as the belt 14 biases the web material 28 upwardly against the cooperating cover 12. Each of covers 12 is provided with an elongated slot 34 to allow the projections 30 of the belt 14 to extend upwardly therein.

Covers 12 are pivotally received on chassis 10 and are provided with an over-center biasing arrangement utilizing spring 26 which extends between the pair of covers 12 and biases them in both the open and closed positions as is well known in the art. The pair of covers 12 is positioned over the portions of the closed belt path extending between drive pulley 16 and arcuate surface 18 to allow the tractor to function as a bidirectional tractor.

The general features of construction of the belt 14, covers 12, and drive sprocket 16 are generally described in Seitz U.S. Pat. No. 4,315,585.

Figure 4:
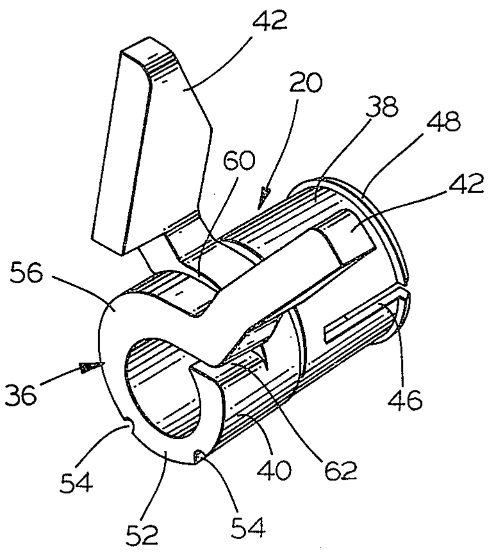
FIG. 4 is a perspective view of the resilient spring clamp subassembly.

The tractor of the present invention is clamped of the resilient spring clamp subassembly 20 on the support shaft 24 movable in the axial direction thereon by releasing the spring clamping subassembly 20. The spring clamp subassembly 20 is a one-piece integrally molded structure made from a resiliently deflectable synthetic resin material exhibiting little creep. As is best seen in FIGS. 3 and 4, the clamp subassembly 20 includes the cylindrical mounting or support element 38 and the resilient spring clamp element generally designated by numeral 36 generally comprised of the cylindrical barrel portion 40 and a pair of laterally extending manually engageable tab portions 42. The support element 38 comprises a cylindrical support sleeve or post having an aperture therethrough with a diameter greater than the diameter of the support shaft 24 to be received therein. The support element 38 has a pair of diametrically opposed, axially extending slots 46 therein and a circumferential collar 48 extending outwardly at the outer end thereof.

Figure 5:
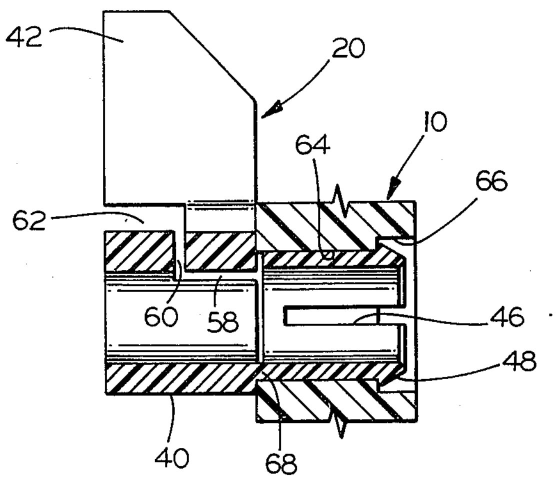
FIG. 5 is a fragmentary sectional view along the line 5—5 of FIG. 3.

Referring further to FIGS. 3–5, the barrel portion 40 of the spring clamp element 36 provides a passage in which the support shaft 24 is resiliently clamped.

The barrel portion 40 has two axially extending slots or slits 58, 62 and a circumferentially extending slot or slit 60 which extend through its wall. The first slot 58 extends axially along the barrel portion 40 from its inner end adjacent the chassis 10 to a midsection of the barrel portion 40 spaced outwardly from the chassis 10. As shown in FIGS. 4 and 5, the second slot 60 extends from an outer end of the first slot 58 circumferentially around the barrel portion 40 at the midsection thereof for a segmental length of about 90 to 180 degrees. The third slot 62 extends axially outwardly from the circumferential slot 60 at a point spaced circumferentially around the barrel portion 40 from the first slot 58 to the outer end of the barrel portion 40. To provide the resilient clamping action, the barrel portion 40 has an arcuately shaped wall portion 52 of substantially uniform thickness opposite the circumferential slot 60 and a pair of axially extending grooves 54 providing a reduced thickness on either side thereof and functioning to form resilient hinge portions. Extending circumferentially from each of grooves 54 to the tab portions 42 are arcuate spring portions 56 which increase in thickness towards the tab portions 42. The spring wall portions 56 of the barrel 40 are cooperatively dimensioned to define the first, second and third slots. Mounted adjacent the first and third slots 58, 62 are the pair of manually engageable tab portions 42 which extend laterally outwardly from the barrel portion 40.

Figure 6:
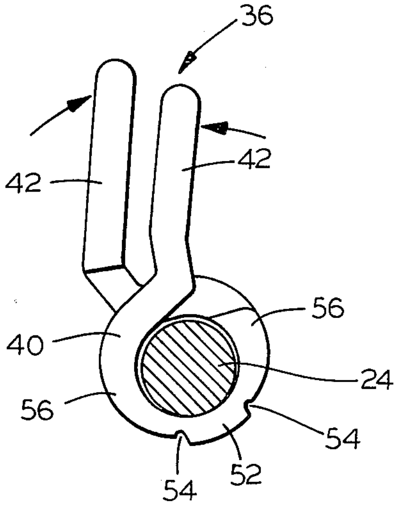
FIGS. 6 and 7 are side elevational views of the spring clamp means in the unclamped and clamped positions, respectively, about a support shaft extending therethrough.
Figure 7:
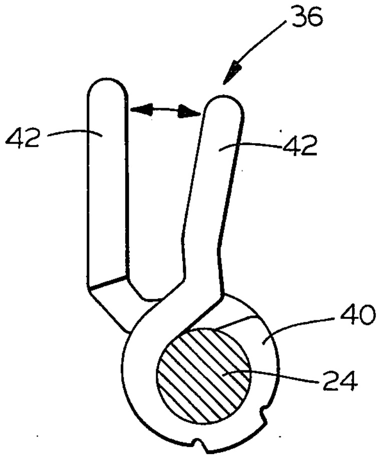

FIGS. 6 and 7 illustrate the spring clamp 36 in the releasing and clamping positions relative to the support shaft 24. The relative positioning of the various wall portions and slots in the spring clamp element 36 allows the arcuate wall portions 56 to flex around the resilient hinge portions when tab portions 42 are manually moved towards one another. Uniform thickness wall portion 52 reinforces the spring clamp 36 and increases the spring pressure thereof. In FIG. 6, the tab portions 42 are being manually moved towards one another against the natural resiliency of barrel portion 40 of spring clamp element 36 to increase the effective diameter of the passage therethrough and release the support shaft 24 to allow axial movement of the tractor relative to the support and drive shafts. When the finger pressure on the tab portions 42 is released, the natural resiliency or memory of the molded plastic spring clamp 36 will return barrel portion 40 into its closed or clamped position to securely or firmly clamp the support shaft 24 within the barrel passage, as shown in FIG. 7.

It should be noted that the passage within the barrel portion 40 as shown in FIG. 3 is slightly out of round when the spring clamp 36 is in its completely closed or at rest position with no shaft received therein since the arcuate spring portions 56 are biased inwardly of a true circle. However, when a support shaft 24 is disposed within the passage as pictured in FIG. 7, it moves the spring portions 56 outwardly and the natural resiliency of the spring clamp 36 will cause the barrel portion 40 to completely surround and resiliently clamp the support shaft 24 therein. The natural resiliency of the spring clamp element 36 is such that variations in the outer diameter of the support shaft 24 may be tolerated.

In clamping the tractor on the support shaft 24 torque may be produced on the drive shaft 22 during rotation thereof as a result of variation in spacing of the centers of the two shafts. This may interfere with the desired operation of the printer. In the present invention, rotatably mounting the resilient spring clamp element 36 within the chassis 10 permits it to rotate and compensate for some of this variation. As seen, the support element 38 is rotatably received within support shaft aperture 64 of chassis 10 thereby allowing relative rotation between the spring clamp subassembly 20 and the remainder of the tractor. This relieves the torque on the drive shaft 22 while minimizing variations in the center to center spacing between the shafts.

Turning to FIG. 5, therein illustrated in detail is the mounting of the spring clamp element 36 on the chassis 10 by use of the cylindrical support element 38 which has axially extending slots 46 therein which are diametrically spaced. At one end of the cylindrical support element 38 is the enlarged collar 48 which seats in a mating recess 66 in the chassis 10 on the side opposite the spring clamp element 36. The slots 46 allow the cylindrical support element 38 to deflect inwardly as the cylindrical support element 38 is inserted into the support shaft aperture 64 from the end opposite the mating recess 66. After the cylindrical support element 38 has been fully inserted into the support shaft aperture 64, the natural resiliency thereof will bias the collar 48 into the mating recess 66. As a result, the clamp subassembly 20 is held in assembly with the chassis 10 as shown in FIG. 5. However, the inner diameter of the support shaft aperture 66 and outer diameter of the cylindrical support element 38 are cooperatively dimensioned so that the support element 38 may rotate within the chassis 10 to reduce the potential torque on the rotating drive shaft 22 as previously explained.

In FIG. 5, the spring clamp subassembly 20 is shown to include a spacer portion 68 which extends between the end of cylindrical support element 38 and the inner end of the uniform thickness portion 52 of the barrel portion 40. The resultant spacing allows the resilient arcuate spring portions 56 to move freely relative to the support element 38 at a point adjacent the chassis 10 as tab portions 42 are pressed towards one another to enlarge the barrel passage.

In operation, after the tractor is mounted on the support and drive shafts, the operator may wish to reposition the tractors based upon the width of the web of perforated paper to be driven thereby. The operator simply presses tab portions 42 towards one another as depicted in FIG. 6 to enlarge the barrel passage and release the support shaft 24, moves the tractor axially along the support and drive shafts to the desired position and then releases the finger pressure on the tab portions 42 to allow the spring clamp 36 to resiliently clamp the support shaft 24 as shown in FIG. 7 and prevent further axial movement thereof. Paper web 28 is then positioned on belt pins 30 between chassis 10 and the appropriate cover 12.

As will be appreciated, the pulleys of the tractors of the present invention may be of the type illustrated having teeth formed therein to engage cooperating teeth on the driven surface of the belt, or they may employ a friction surface to engage a frictionally driven surface on the belt, or they may employ any other suitable means for effecting driving engagement therebetween.

As is conventional for larger tractors, an idler pulley may be employed at the other end of the chassis to provide the belt support surface rather than the arcuate shoe surface of the illustrated embodiment. Such idler pulley assemblies are shown in the aforementioned Seitz patents. Moreover, this type of assembly may have a chassis body having a third aperture for the idler pulley.

The spring clamp subassembly is integrally molded from a synthetic resin providing the necessary resilient deflection and exhibiting good resistance to creep. Especially useful are glass-filled polycarbonate resins. Although glass-filled polyester resins and unfilled polyamide resins such as Nylon ST resins may also be employed.

Thus, it can be seen from the foregoing detailed specification and attached drawings that the drive tractor of the present invention utilizes a new and improved clamping means which minimizes variation in shaft spacing and torque on the drive shaft created by the clamping action between the tractor and the support shaft, thus enabling smooth tracking of the web material being driven thereby.

Having thus described the invention, what is claimed is:

1. In a drive tractor for web material, the combination comprising:

A. a chassis having a transversely extending support shaft aperture therein;

B. a flexible endless belt extending about said chassis, said belt defining a closed path of travel thereabout and having an outer driving surface to engage the web material and an inner driven surface;

C. a pulley rotatably mounted in said chassis and having its outer surface in driving engagement with said inner driven surface of said belt, said pulley having an aperture therethrough for receiving a drive shaft to effect rotation of said pulley and thereby said belt;

D. guide means on said chassis overlying said endless belt along a portion of said closed path;

E. resilient clamp means adjacent said support shaft aperture, said resilient clamp means including a barrel portion of resiliently deflectable material extending outwardly from a side of said chassis and defining a passage for releasable reception of a support shaft therein, said barrel portion having a first slot therein extending axially from the inner end of said barrel portion to a point spaced outwardly from the inner end thereof, said barrel portion having a second slot therein extending from the outer end of said first slot circumferentially for a segmental length thereof, said barrel portion having a third slot therein extending axially along said barrel portion from said second slot at a point spaced circumferentially from said first slot to the outer end of said barrel portion, said clamp means further including a pair of tab portions extending laterally from said barrel portion adjacent said first and third slots, whereby manually moving said tab portions toward one another enlarges a passage for releasable reception of said support shaft; and F. means mounting said clamp means to said chassis.

2. The tractor in accordance with claim 1 wherein said resilient clamp means and said mounting means are portions of a unitary integrally molded member.

3. The tractor in accordance with claim 1 wherein said barrel portion has an arcuately shaped wall portion spaced oppositely from said circumferentially extending slots, resilient hinge portions adjacent each side of said arcuate wall portion and arcuate spring portions extending from each of said resilient hinge portions tab portions.

4. The tractor in accordance with claim 3 wherein said arcuately shaped wall portion has a substantially uniform thickness and each of said arcuate spring portions increase in thickness from an end adjacent end resilient hinge portions towards the tab portions.

5. The tractor in accordance with claim 3 wherein each of said resilient hinge portions have an axially extending groove providing a reduced thickness adjacent said arcuately shaped wall portion.

6. The tractor in accordance with claim 1 wherein said means mounting said clamp means is rotatably mounted on said chassis to permit rotation of said clamp means relative to said chassis.

7. The tractor in accordance with claim 6 wherein said chassis support shaft aperture is of generally circular configuration and wherein said mounting means includes a generally cylindrical support post rotatably mounted within said support shaft aperture.

8. The tractor in accordance with claim 7 wherein said cylindrical support post has a pair of diametrically opposed axially elongated slots therein and an enlarged collar engaged in a mating recess in a wall of said chassis defining said aperture whereby said clamp means and mounting means are retained against axial movement relative to said chassis.

9. The tractor in accordance with claim 7 wherein said mounting means includes a spacer portion extending between said resilient clamp means and said cylindrical support post to provide spacing therebetween.

10. The tractor in accordance with claim 7 wherein said resilient clamp means and said means mounting said clamp means are portions of a one-piece integrally molded member.

11. The tractor in accordance with claim 1 wherein said tractor is adapted for bidirectional operation and has a second guide means on said chassis overlying said endless belt along a second portion of said closed path.

12. In a drive tractor for web material, the combination comprising:

A. a chassis having a transversely extending support shaft aperture therein;

B. a flexible endless belt extending about said chassis, said belt defining a closed path of travel thereabout and having an outer driving surface to engage the web material and an inner driven surface;

C. a pulley rotatably mounted in said chassis and having it outer surface in driving engagement with said inner driven surface of said belt, said pulley having an aperture therethrough for receiving a drive shaft to effect rotation of said pulley and thereby said belt;

D. guide means on said chassis overlying said endless belt along a portion of said closed path; and E. a unitary integrally molded spring clamp subassembly of resiliently deflectable material having a spring clamp element and a support element, said spring clamp element including a barrel portion extending outwardly from a side of said chassis and defining a passage for releasable reception of a support shaft there, said barrel portion having a first slot therein extending axially from the inner end of said barrel portion to a point spaced outwardly from the inner end thereof, said barrel portion having a second slot therein extending from the outer end of said first slot circumferentially for a segmental length around said barrel portion, said barrel portion having a third slot therein extending axially along said barrel portion from said second slot at a point spaced circumferentially from said first slot to the outer end of said barrel portion, said clamp means further including a pair of tab portions extending laterally outwardly from said barrel portion adjacent said first and third slots, said barrel portion has an arcuately shaped wall portion spaced oppositely from said circumferentially extending slot, resilient hinge portions adjacent each side of said arcuate wall portion and arcuate spring portions extending from each of said resilient hinge portions to said tab portions, whereby manually moving said tab portions toward one another enlarges said passage for releasable reception of a support shaft.

13. The tractor in accordance with claim 12 wherein said arcuate spring portions of said barrel portion are cooperatively dimensioned to define said first, second and third slots.

14. The tractor in accordance with claim 12 wherein said support element is rotatably mounted within said chassis to permit rotation of said clamp subassembly relative to said chassis.

15. The tractor in accordance with claim 14 wherein said chassis support shaft aperture is of generally circular configuration and wherein said mounting means includes a generally cylindrical support post rotatably mounted within said support shaft aperture.

16. The tractor in accordance with claim 15 wherein said clamp subassembly further includes a spacer portion extending between said barrel portion and said support post to provide a spacing therebetween.

* * * * *